United States Patent
Fujino

(10) Patent No.: US 7,463,277 B2
(45) Date of Patent: Dec. 9, 2008

(54) COLOR IMAGE FORMING APPARATUS HAVING SCANNING LENS DISPOSED IN REVERSE ORIENTATION

(75) Inventor: Hitoshi Fujino, Kasugai (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 184 days.

(21) Appl. No.: 11/190,645

(22) Filed: Jul. 26, 2005

(65) Prior Publication Data

US 2006/0017998 A1 Jan. 26, 2006

(30) Foreign Application Priority Data

Jul. 26, 2004 (JP) .............. 2004-216918

(51) Int. Cl.
*G02B 26/10* (2006.01)
*B41J 2/47* (2006.01)

(52) U.S. Cl. .................................... 347/244

(58) Field of Classification Search ............... 347/244, 347/256–261, 241, 242; 359/204, 205
See application file for complete search history.

(56) References Cited

U.S. PATENT DOCUMENTS

| | | | |
|---|---|---|---|
| 5,157,536 A * | 10/1992 | Uematsu | ............ 359/217 |
| 6,243,124 B1 | 6/2001 | Ozaki et al. | |
| 6,268,876 B1 | 7/2001 | Ozaki et al. | |
| 6,275,249 B1 | 8/2001 | Ozaki et al. | |
| 6,304,282 B1 * | 10/2001 | Fujimoto | ............ 347/242 |
| 6,353,455 B1 | 3/2002 | Ozaki et al. | |
| 6,825,870 B2 | 11/2004 | Kato | |
| 6,956,686 B2 * | 10/2005 | Koreeda | ............ 359/207 |
| 7,072,087 B2 * | 7/2006 | Nakahata | ............ 359/204 |
| 7,227,563 B2 * | 6/2007 | Toyoda | ............ 347/244 |
| 2003/0169436 A1 | 9/2003 | Toyoda | |

FOREIGN PATENT DOCUMENTS

JP          10048557 A  *  2/1998

OTHER PUBLICATIONS

Patent Abstracts of Japan for JP2003-262813 published Sep. 19, 2003.
Patent Abstracts of Japan for JP2000-009589 published Jan. 14, 2000.
Patent Abstracts of Japan for JP11-064754 published Mar. 5, 1999.
Patent Abstracts of Japan for JP2003-241126 published Aug. 27, 2003.

* cited by examiner

*Primary Examiner*—Huan H Tran
(74) *Attorney, Agent, or Firm*—Darby & Darby

(57) ABSTRACT

A color image forming apparatus forms color images on a recording medium by superposing images one after another. The color image forming apparatus includes at least one image bearing member and a plurality of scanning units. At least the one image bearing member bears a latent image thereon. The plurality of scanning units includes a first scanning unit and a second scanning unit. Each scanning unit scans a light beam over at least the one image bearing member to form the latent image thereon. The first scanning unit and the second scanning unit share at least one lens having an optical axis and a shape substantially symmetrical with respect to the optical axis. At least the one lens is disposed in a reverse orientation rotated 180 degrees from a normal orientation about the optical axis.

11 Claims, 11 Drawing Sheets

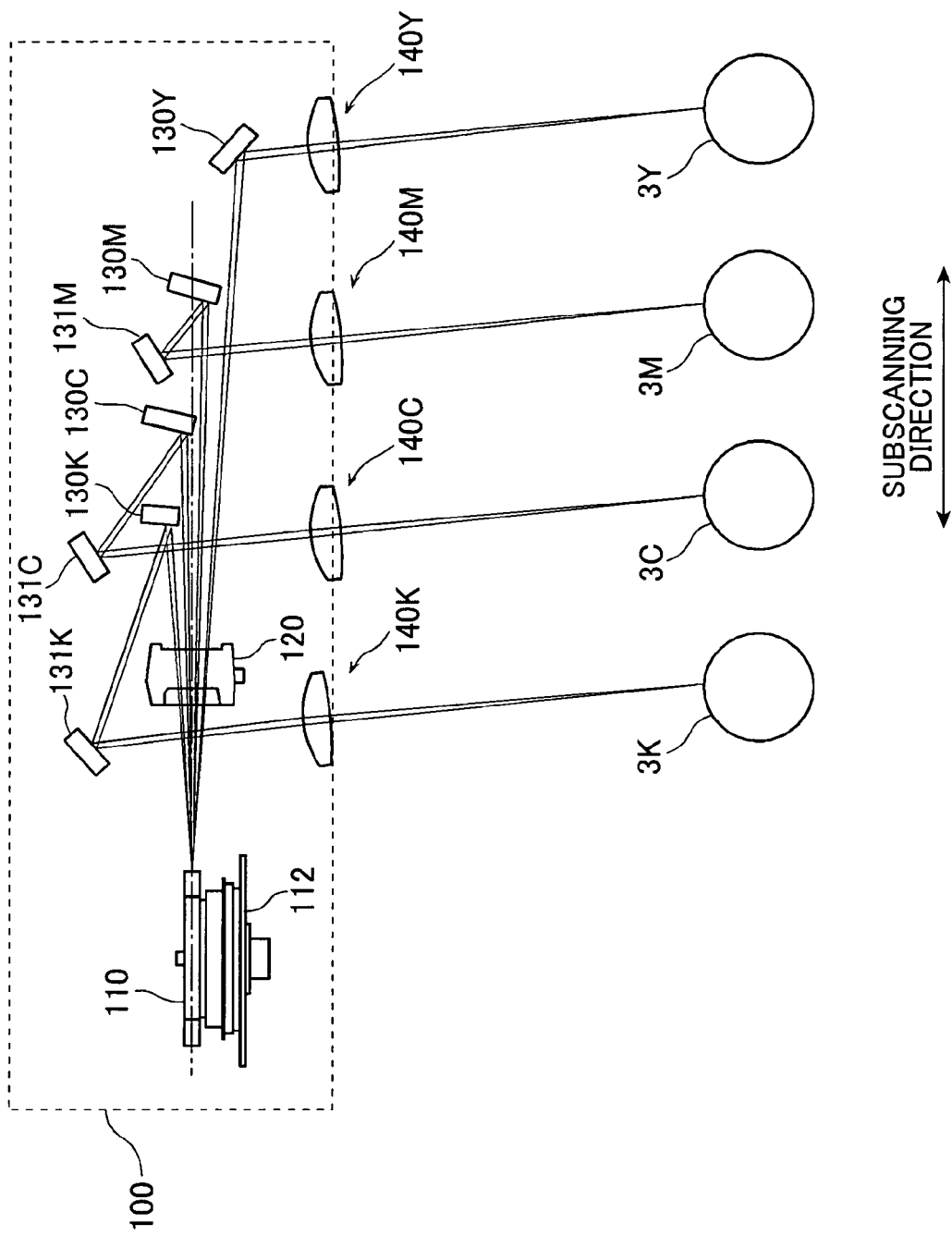

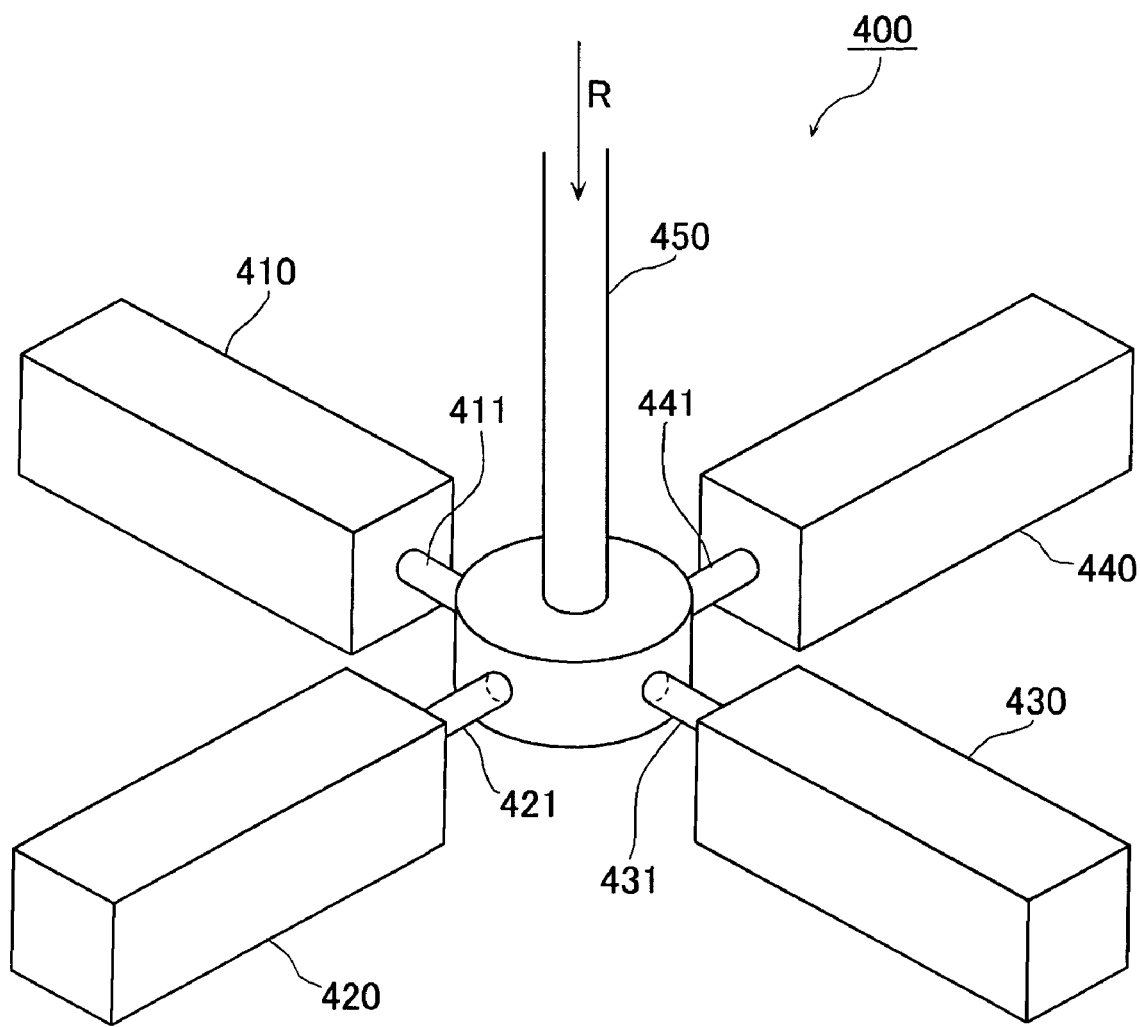

FIG.6D
| FIRST CAVITY | SECOND CAVITY | COLOR | SCAN LINE SHAPE |
|---|---|---|---|
| A-NO | E-NO | Y |  |
| A-NO | E-NO | M |  |
| A-NO | E-NO | C |  |
| A-NO | E-NO | K |  |
| A-YES | E-NO | Y |  |
| A-YES | E-NO | M |  |
| A-YES | E-NO | C |  |
| A-YES | E-NO | K |  |
| A-NO | E-YES | Y |  |
| A-NO | E-YES | M |  |
| A-NO | E-YES | C |  |
| A-NO | E-YES | K | 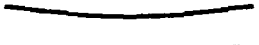 |
| A-YES | E-YES | Y |  |
| A-YES | E-YES | M |  |
| A-YES | E-YES | C |  |
| A-YES | E-YES | K |  |

| FIRST CAVITY | SECOND CAVITY | COLOR | SECOND CAVITY | COLOR | |
|---|---|---|---|---|---|
| A-NO | E-NO | Y | F-YES | M | 501 |
| A-NO | E-NO | Y | G-YES | C | 502 |
| A-NO | E-NO | Y | H-YES | C | 503 |
| A-NO | E-NO | Y | G-YES | K | 504 |

COLOR IMAGE FORMING APPARATUS HAVING SCANNING LENS DISPOSED IN REVERSE ORIENTATION

INCORPORATION BY REFERENCE

The present application claims priority under 35 U.S.C. §119 to Japanese Patent Application No. 2004-216918 filed on Jul. 26, 2004. The content of the application is incorporated herein by reference in its entirety.

BACKGROUND OF THE INVENTION

1. Field of the Invention

The present invention relates to a color image forming apparatus, a scanning device, a lens set, a method for fabricating a color image forming apparatus, and a storage medium for storing a program used for fabricating a color image forming apparatus.

2. Description of Related Art

Conventional color image forming apparatuses form color images by superposing toner images in the colors cyan (C), magenta (M), yellow (Y), and black (K). Color image forming apparatuses that employ the tandem system are provided with a plurality of image bearing members (photosensitive drums or the like), one for each color. The surface of each image bearing member is exposed by a light beam according to image data corresponding to each color image, forming a latent image that is subsequently developed with toner. The toner images of each color are then transferred sequentially and superposed over one another on an intermediate transfer medium or a paper or other recording medium, thereby forming a color image.

The laser printer is one conventional example of an image forming apparatus that scans and exposes an image bearing member. In this exposure process, a light-emitting unit of the laser printer, such as a semiconductor laser, emits a laser beam. When laser beam, having divergent rays, passes through a collimator lens, the collimator lens converts the light beam into substantially parallel rays. In order to perform face tangle error correction, a cylindrical lens is provided to converge the light rays in a sub-scanning direction, guiding the light onto a polygon mirror that is rotating at a high speed. The light beam is reflected off the polygon mirror, passes through a scanning device, including an fθ lens, a cylindrical lens, and other scanning lenses, and is scanned over the surface of the image bearing member.

The fθ lens functions to focus the light beam and simultaneously correct the beam so that the beam spot is scanned over the image bearing member at a constant velocity Recently, nonspherical lenses formed by resin molds have been widely used in scanning units having an fθ lens. A color image forming apparatus is provided with a semiconductor laser for forming images in each color. The light beam irradiated from the semiconductor laser is deflected by a polygon mirror and guided onto the surface of the image bearing member by a scanning unit provided for each color (although some lenses are shared among units), scanning the laser beam over the image bearing member.

However, when color images are formed by superposing toner images in each color, problems in registration among colors can occur. For example, as disclosed in Japanese patent-application publication No. 2003-262813, color misregistration occurs when the position of the laser spot determined by each scanning unit for forming images on the image bearing member deviates relative to the laser spots of other colors. Specifically, if the slope, curvature, and the like of scan lines for each scanning unit do not align, color registration may be off, resulting in a decline in image quality. Although curves and the like in scan lines may occur due to various reasons, one such reason is a difference in cavities, that is, error in precision due to the cavities when lenses are molded with a plurality of cavities. Japanese patent-application publication No. 2003-262813 describes a technology designed to reduce the error in precision.

In the technology disclosed in Japanese patent-application publication No. 2003-262813, cavities are sorted into groups based on variations in optical characteristics caused by differences among cavities so that a relative difference in optical characteristic values among cavities in the same group fall within a tolerable range. One lens for each scanning unit is selected from a single group in order to suppress deviations in color registration.

When a scanning unit is provided for each of four colors CMYK, lenses constituting the scanning units for the two colors cyan and magenta, for example, may each include a lens molded with cavities having the same specifications. In such a case, obviously it is desirable to use two lenses molded using the same cavity in order to eliminate the problem of differences between cavities. However, this is not always possible, particularly in mass-production. Hence, the technology in Japanese patent-application publication No. 2003-262813 attempts to reduce misregistration by sorting the cavities into groups of lenses for suppressing problems in registration among colors as much as possible.

SUMMARY

However, when lenses are molded using a plurality of molds having a plurality of cavities, the technology described above may not be able to support mass-production if one of the molds must undergo maintenance and cannot be used.

In view of the foregoing, it is an object of the present invention to provide a color image forming apparatus, a scanning device, a lens set, a method for fabricating a color image forming apparatus, and a storage medium for storing a program used for fabricating a color image forming apparatus, that are suitable for mass-production.

In order to attain the above and other objects, according to one aspect, the present invention provides a color image forming apparatus for forming color images on a recording medium by superposing images one after another. The color image forming apparatus includes at least one image bearing member and a plurality of scanning units. The at least one image bearing member bears a latent image thereon. The plurality of scanning units includes a first scanning unit and a second scanning unit. Each scanning unit scans a light beam over the at least one image bearing member to form the latent image thereon. The first scanning unit and the second scanning unit share at least one lens having an optical axis and a shape substantially symmetrical with respect to the optical axis. The at least one lens is disposed in a reverse orientation rotated 180 degrees from a normal orientation about the optical axis.

According to another aspect, the present invention provides a color image forming apparatus for forming color images on a recording medium by superposing images one after another. The color image forming apparatus includes at least one image bearing member and a plurality of scanning units. The at least one image bearing member bears a latent image thereon. The plurality of scanning units includes a first scanning unit having a first lens and a second scanning unit having a second lens. Each scanning unit scans a light beam over the at least one image bearing member to form the latent image thereon. The first lens and the second lens have substantially same optical characteristic. Each lens has an optical axis and a shape substantially symmetrical with respect to the optical axis. The first lens is disposed in a normal orientation and the second lens is disposed in a reverse orientation rotated 180 degrees from the normal orientation about the optical axis.

According to another aspect, the present invention provides a scanning device. The scanning device includes a plurality of scanning units including a first scanning unit and a second scanning unit that scan a light beam. The first scanning unit and the second scanning unit share at least one lens having an optical axis and a shape substantially symmetrical with respect to the optical axis. The at least one lens is disposed in a reverse orientation rotated 180 degrees from a normal orientation about the optical axis.

According to another aspect, the present invention provides a scanning device. The scanning device includes a plurality of scanning units including a first scanning unit having a first lens and a second scanning unit having a second lens. The first lens and the second lens have substantially same optical characteristic. Each lens has an optical axis and a shape substantially symmetrical with respect to the optical axis. The first lens is disposed in a normal orientation and the second lens is disposed in a reverse orientation rotated 180 degrees from the normal orientation about the optical axis.

According to another aspect, the present invention provides a lens set. The lens set includes a plurality of lenses with substantially same optical characteristic. Each lens has an optical axis and a shape substantially symmetrical with respect to the optical axis. The plurality of lenses includes a first lens and a second lens. The first lens is configured to be disposed in a normal orientation when the first lens is mounted in a first scanning unit. The first lens is molded with a first cavity. The second lens is configured to be disposed in a reverse orientation rotated 180 degrees from the normal orientation about the optical axis when the second lens is mounted in a second scanning unit. The second lens is molded with a second cavity having same specifications as the first cavity. A deviation in a predetermined sub-scanning direction between a first scan line and a second scan line is within a predetermined range. The first scan line is generated by the first scanning unit when the first lens is mounted in the first scanning unit. The second scan line is generated by the second scanning unit when the second lens is mounted in the second scanning unit.

According to another aspect, the present invention provides a method for fabricating a color image forming apparatus that uses a plurality of lenses with substantially same optical characteristic. Each lens has an optical axis and a shape substantially symmetrical with respect to the optical axis. The method includes measuring an optical characteristic of each lens disposed in a normal orientation and in a reverse orientation rotated 180 degrees from the normal orientation about the optical axis, selecting a combination relating to orientations of the plurality of lenses based on a predetermined criteria, and mounting the plurality of lenses in orientations in accordance with the combination obtained in the selecting step.

According to another aspect, the present invention provides a storage medium for storing a program readable by a computer and used for fabricating a color image forming apparatus. The color image forming apparatus includes at least one image bearing member that bears latent images thereon and a plurality of scanning units each scanning a light beam over the at least one image bearing member in a main scanning direction while the at least one image bearing member moves in a sub-scanning direction to form the latent images thereon. The plurality of scanning units uses a plurality of lenses molded with a plurality of cavities having same specifications. Each lens has an optical axis and a shape substantially symmetrical with respect to the optical axis. The program includes a program of selecting a first scan line shape data and a second scan line shape data from a plurality of scan line shape data, the plurality of scan line shape data being obtained by measuring shapes of scan lines generated using the plurality of lenses each disposed in a normal orientation and in a reverse orientation rotated 180 degrees from the normal orientation about the optical axis, the measurements being conducted for each scanning unit in which the lens is disposed and for each cavity with which the lens is molded, a program of comparing the first scan line shape data and the second scan line shape data, and a program of determining whether a deviation in the sub-scanning direction between the first scan line shape data and the second scan line shape data is within a predetermined range.

BRIEF DESCRIPTION OF THE DRAWINGS

The above and other objects, features and advantages of the invention will become more apparent from reading the following description of the preferred embodiments taken in connection with the accompanying drawings in which:

FIG. 2 is an explanatory diagram showing a construction of scanning units provided in a scanning device of the color laser printer according to the embodiment;

FIG. 3 is a perspective view of a mold for molding scanning lenses;

FIG. 6D is a table showing an example of scan line shape data;

DETAILED DESCRIPTION OF THE PREFERRED EMBODIMENTS

A color image forming apparatus, a scanning device, a lens set, a method for fabricating a color image forming apparatus, and a storage medium for storing a program used for fabricating a color image forming apparatus according to an embodiment of the present invention will be described while referring to the accompanying drawings.

<Overall Construction of Color Laser Printer>

Figure 1:
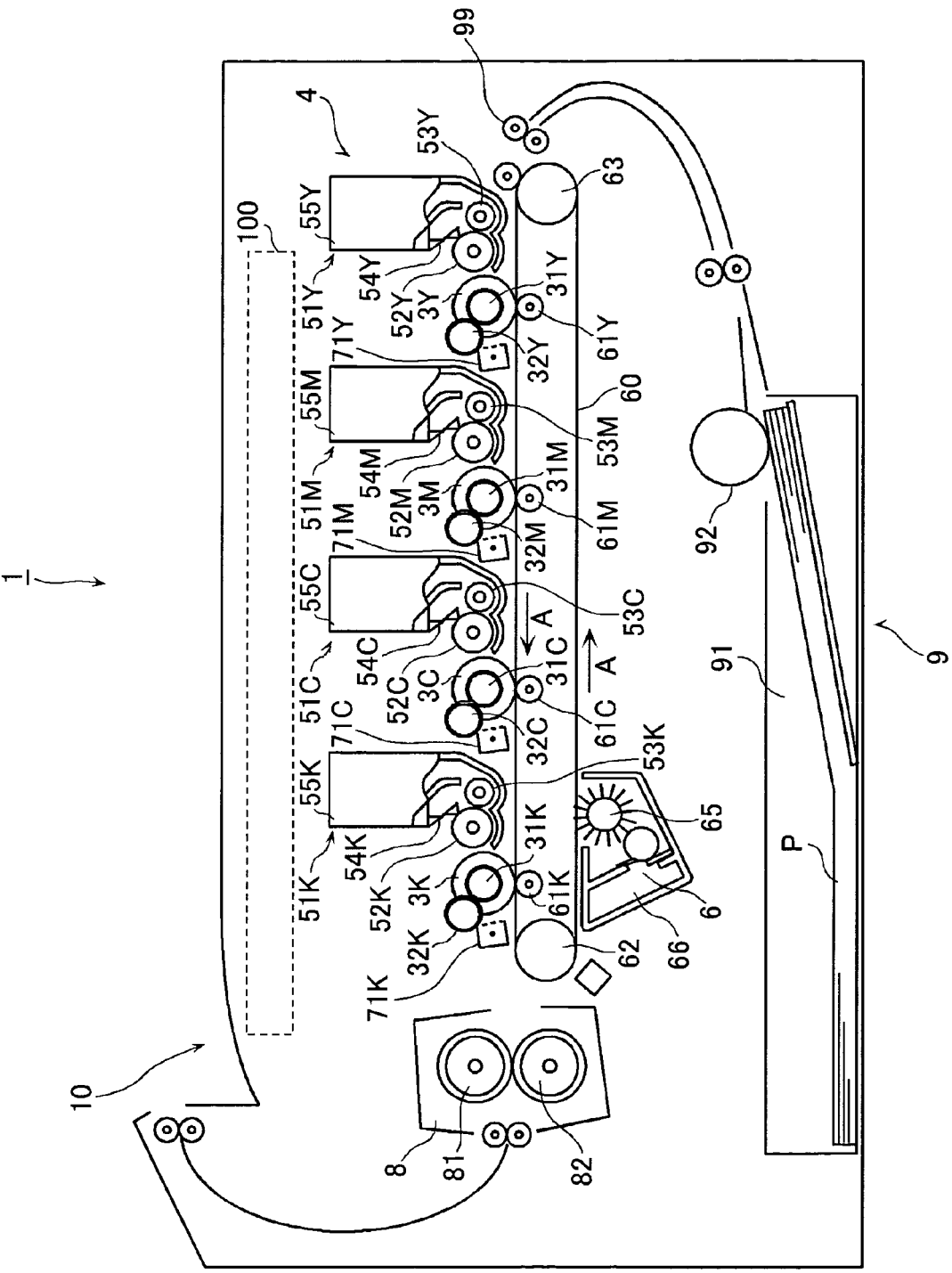
FIG. 1 is a vertical cross-sectional view showing a construction of a color laser printer according to an embodiment of the present invention.

FIG. 1 is a vertical cross-sectional view showing the construction of a color laser printer according to the embodiment.

A color laser printer 1 is a tandem type color image forming apparatus for forming color images on a recording medium, such as a recording paper P. The color laser printer 1 includes photosensitive drums 3Y, 3M, 3C, and 3K (hereinafter also referred to as the "photosensitive drums 3") corresponding to the colors yellow (Y), magenta (M), cyan (C), and black (K). The photosensitive drums 3 sequentially superpose (superimpose) toner images of their respective colors on the recording paper P, as the recording paper P is conveyed on a paper conveying belt 60.

The color laser printer 1 also includes a toner image forming unit 4, a fixing unit 8, a paper supplying unit 9, a paper discharge tray 10, and a scanning device 100. The paper supplying unit 9 supplies sheets of the recording paper P to the toner image forming unit 4, and the toner image forming unit 4 forms color images on the recording paper P. Subsequently, the fixing unit 8 fixes the image to the recording paper P, and the recording paper P is discharged onto the paper discharge tray 10.

The paper supplying unit 9 is disposed in the bottommost section of the color laser printer 1 and includes a paper cassette 91 for accommodating the recording paper P or other recording medium, and a feeding roller 92 for conveying sheets of the recording paper P onto a paper conveying path. The feeding roller 92 is driven to supply the recording paper P at a predetermined timing synchronized with components in the toner image forming unit 4. The sheets of recording paper P supplied from the paper supplying unit 9 are conveyed onto the paper conveying belt 60 by a pair of conveying rollers 99.

The toner image forming unit 4 sequentially forms toner images in each color on the sheet of recording paper P supplied from the paper supplying unit 9 as the recording paper P is conveyed on the paper conveying belt 60. The paper conveying belt 60 is looped about a drive roller 62 and a follow roller 63. A drive motor (not shown) drives the drive roller 62 to rotate so that the paper conveying belt 60 moves in the direction indicated by an arrow A in FIG. 1. The toner image forming unit 4 is configured of separate units for each color that sequentially transfer images in their respective colors onto the recording paper P conveyed on the paper conveying belt 60 in order to form a color image thereon.

A cleaning unit 6 is disposed on the underside of the paper conveying belt 60. The cleaning unit 6 includes a scraping member 65 for scraping toner remaining on the surface of the paper conveying belt 60, and a residual toner case 66 for collecting toner scraped off the paper conveying belt 60 by the scraping member 65.

In addition to the photosensitive drums 3 mentioned above, the toner image forming unit 4 includes chargers 71Y, 71M, 71C, and 71K (hereinafter referred to as "chargers 71") and developing units 51Y, 51M, 51C, and 51K (hereinafter referred to as "developing units 51") in the corresponding toner image forming units corresponding to each of the toner colors yellow, magenta, cyan, and black. Here, the colors yellow, magenta, cyan, and black will be represented by the letters Y, M, C, and K, and components related to each color will have the letters Y, M, C, and K appended to their reference numeral to indicated the corresponding color.

The units of each color configuring the toner image forming unit 4 are arranged above the paper conveying belt 60 one after another beginning from the upstream side of the paper conveying path in order to form toner images in the order Y, M, C, and K. Next, the construction of the units configuring the toner image forming unit 4 will be described.

The photosensitive drums 3 are formed in a cylindrical shape of an aluminum base material, the surface of which is coated with a positive charging photosensitive layer. The aluminum base material functions as a ground layer. Gears 31Y, 31M, 31C, and 31K ("gears 31") are provided on side end surfaces of the photosensitive drums 3Y, 3M, 3C, and 3K, respectively, and are engaged with respective gears 32Y, 32M, 32C, and 32K ("gears 32") by which the gears 31 are driven. The gears 32 for driving the gears 31 are driven by respective simple drive motors (not shown) to rotate simultaneously at the same angular velocity. Consequently, the photosensitive drums 3 are driven to rotate in the clockwise direction.

The chargers 71 are Scorotron chargers disposed below the respective photosensitive drums 3 so as to oppose but not contact the surfaces of the same. The chargers 71 form a uniform positive charge over the surfaces of the photosensitive drums 3. The developing units 51 have casings 55Y, 55M, 55C, and 55K ("casings 55") for accommodating toner. The developing units 51 also include respective developing rollers 52Y, 52M, 52C, and 52K ("developing rollers 52"), supply rollers 53Y, 53M, 53C, and 53K ("supply rollers 53"), and thickness regulating blades 54Y, 54M, 54C, and 54K ("thickness regulating blades 54").

The developing rollers 52 are cylindrical in shape and constructed of an elastic base material, such as a conductive silicon rubber or a conductive urethane rubber, the surface of which is coated with a resin or rubber material containing fluorine. The supply rollers 53 are formed of a conductive sponge roller and are disposed so as to contact the developing rollers 52 with pressure applied by the elastic force of the sponge roller. The supply rollers 53 may be configured of an appropriate foam member formed of a conductive silicon rubber, EPDM, or urethane rubber.

Each of the thickness regulating blades 54 has a base end formed of stainless steel or the like in a plate shape that is fixed to the respective casing 55, and a free end formed of an insulating silicon rubber or an insulating rubber or synthetic resin containing fluorine. The free end of the thickness regulating blades 54 contacts the respective developing roller 52 with pressure.

The supply rollers 53 in the developing units 51 supply toner accommodated in the respective casings 55 to the respective developing rollers 52. The thickness regulating blades 54 regulate the toner on the surfaces of the developing rollers 52 so that a uniform thin layer is carried thereon. Hence, after the scanning device 100 forms electrostatic latent images on the surfaces of the photosensitive drums 3 by scanning a laser beam over these surfaces, the developing rollers 52 develop the electrostatic latent images with toner according to a reverse developing method.

The color laser printer 1 also includes transfer rollers 61Y, 61M, 61C, and 61K ("transfer rollers 61") disposed below the respective photosensitive drums 3 and on the inside of the paper conveying belt 60 so that the paper conveying belt 60 is interposed between the photosensitive drums 3 and the transfer rollers 61. The transfer rollers 61 apply a transfer bias that causes toner images developed on the surfaces of the photosensitive drums 3 to be transferred sequentially onto the sheet of recording paper P conveyed on the top surface of the paper conveying belt 60.

The fixing unit 8 is provided with a heating roller 81, and a pressure roller 82 disposed so as to contact the entire length of the heating roller 81 with pressure. After toner images in each color Y, M, C, and K have been transferred onto the sheet of recording paper P, the heating roller 81 fixes the toner images to the recording paper P with heat as the recording paper P passes between the heating roller 81 and pressure roller 82. After passing through the fixing unit 8, the recording paper P is discharged onto the paper discharge tray 10 provided on the top surface of the color laser printer 1.

<Construction of Scanning Device>

Next, the construction of the scanning device 100 provided in the color laser printer 1 according to the embodiment will be described. FIG. 2 is an explanatory diagram showing the construction of scanning units provided in the scanning device 100.

The scanning device 100 includes a unit frame 160 (FIG. 4C) molded from a synthetic resin, such as a polycarbonate resin. Mounted in the unit frame 160 are a laser diode (LD) holder (not shown in FIG. 2) in which are mounted a laser light-emitting unit, a collimator lens, and the like; a polygon mirror 110 for deflecting a laser beam produced by the laser light-emitting unit; a polygon motor 112 for driving the polygon mirror 110 to rotate; an scanning unit; and the like.

The scanning device 100 according to the present embodiment includes an fθ lens 120 shared by light beams for each color, reflecting mirrors 130Y, 130M, 130C, and 130K ("reflecting mirrors 130") and reflecting mirrors 131M, 131C, and 131K ("reflecting mirrors 131") for directing the light beams of the respective colors toward the corresponding photosensitive drums 3, and cylindrical lenses 140Y, 140M, 140C, and 140K ("cylindrical lenses 140") for each color.

The fθ lens 120 corrects the light beams so that a beam spot is scanned over the surfaces of the respective photosensitive drums 3 at a constant speed. The cylindrical lenses 140 converge the laser beams in a sub-scanning direction orthogonal to the main scanning direction of the polygon mirror 110. In the present embodiment, the fθ lens 120 and the cylindrical lenses 140 are the scanning lenses.

Since the fθ lens 120 or any of the cylindrical lenses 140 can be disposed in an orientation rotated 180 degrees from the normal orientation about the optical axis (hereinafter referred to as a "reverse orientation"), a color image forming apparatus suitable for mass-production can be provided. In order for this configuration to be possible, the lenses have a shape and optical characteristics that make the lenses usable even when mounted in a reverse orientation. That is, the lenses have a shape substantially symmetrical with respect to the optical axis. It is also necessary that deviations in color registration when images of each color are ultimately superposed on the recording medium fall within a tolerable range (allowable range).

Here, the molds used to form the fθ lens 120 and the cylindrical lenses 140 will be described. While most conventional scanning lenses have been implemented through a combination of spherical lenses formed in glass molds, more and more scanning lenses are being manufactured by molding synthetic resins having a relatively low hygroscopicity, such as amorphous olefin resin, as demands increase for mass-production and reduced costs.

FIG. 3 shows a sample mold for molding resin for a scanning lens. As illustrated by a mold 400 in the example of FIG. 3, molds for forming scanning lenses generally include a plurality of cavities having the same specifications. In the example of FIG. 3, the mold 400 has four cavities 410, 420, 430, and 440. The mold 400 also includes an injection tube 450 for injection a resin indicated by an arrow R. The cavities 410, 420, 430, and 440 are disposed radially about the injection tube 450. By injecting resin into each of the cavities via injection tubes 411, 421, 431, and 441 in a process of injection molding, lenses having substantially same specifications are produced.

Figure 4A:
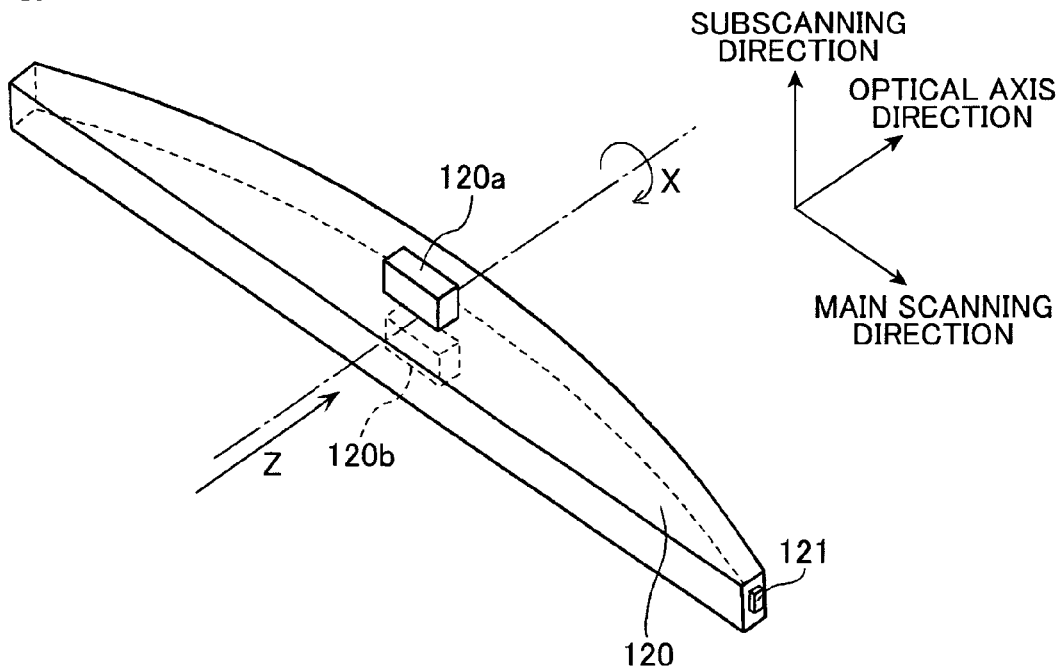
FIG. 4A is a perspective view of an fθ lens in the scanning device.
Figure 4B:
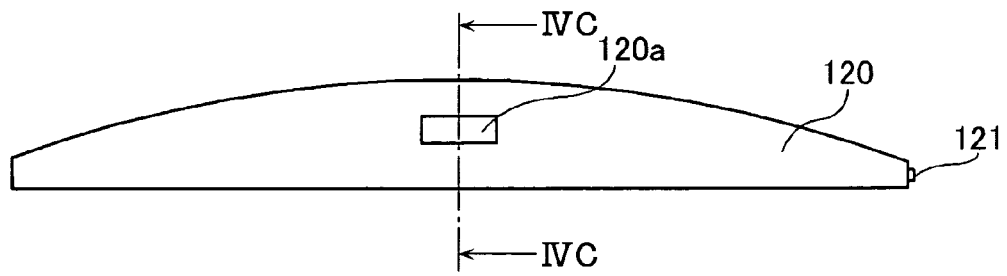
FIG. 4B is a top view of the fθ lens.
Figure 4C:
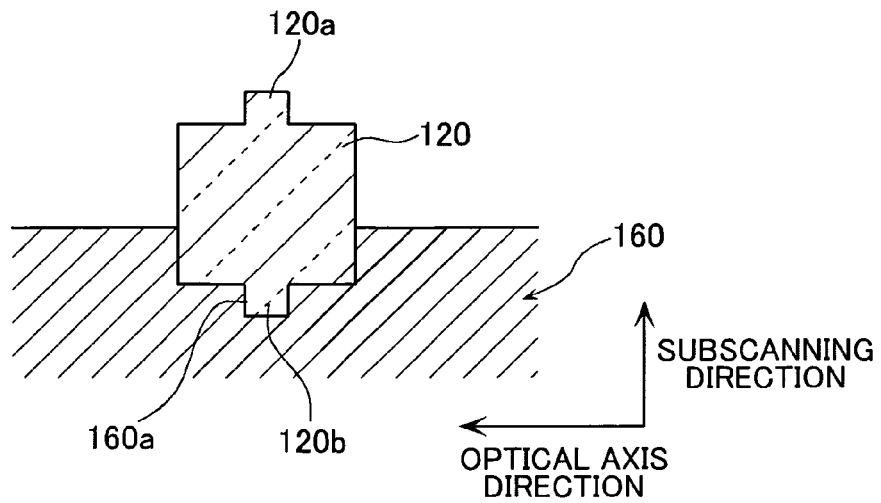
FIG. 4C is a cross-sectional view of the fθ lens taken along a line IVC-IVC in FIG. 4B illustrating the method of mounting the fθ lens in a unit frame.

FIGS. 4A through 4C are diagrams showing the shape of the fθ lens 120 used in the present embodiment and a method for mounting the fθ lens 120 in the unit frame 160. FIG. 4A is a perspective view of the fθ lens 120. FIG. 4B is a top view of the fθ lens 120. FIG. 4C is a cross-sectional view of the fθ lens 120 taken along a line IVC-IVC in FIG. 4B illustrating how the fθ lens 120 is mounted in the unit frame 160 (the unit frame 160 is not shown in FIG. 4B).

As shown in FIG. 4A, the fθ lens 120 used in the present embodiment is left-to-right symmetrical about the optical axis of the same lens, indicated by a single-dot chain line in FIG. 4A. Hence, the shape of the fθ lens 120 is such that the fθ lens 120 can be rotated 180 degrees in a direction indicated by an arrow X and mounted in a reverse orientation. Further, a top surface and bottom surface of the fθ lens 120 in a top-to-bottom direction orthogonal to the optical axis of the fθ lens 120 are substantially planar. Engaging protrusions 120a and 120b are provided on the top and bottom surfaces, respectively, in a center region with respect to the main scanning direction. A gate portion 121 for injecting resin remains on the lens after the injection molding process is complete and the lens has been cut out from the mold.

In the present embodiment, the fθ lens 120 is disposed in a normal orientation when the gate portion 121 is positioned on the right side of the fθ lens 120 viewed from the direction in which the laser beam passes therethrough (the Z-direction in FIG. 4A).

When mounting the fθ lens 120 in the unit frame 160, the position of the fθ lens 120 can be easily determined by inserting either the engaging protrusion 120a or the engaging protrusion 120b into an engaging depression 160a formed in the unit frame 160. Hence, the engaging protrusions 120a and 120b provided on the top and bottom surfaces of the fθ lens 120 can determine the position of the fθ lens 120 whether the fθ lens 120 is mounted in the normal orientation or the reverse orientation.

Figure 4D:
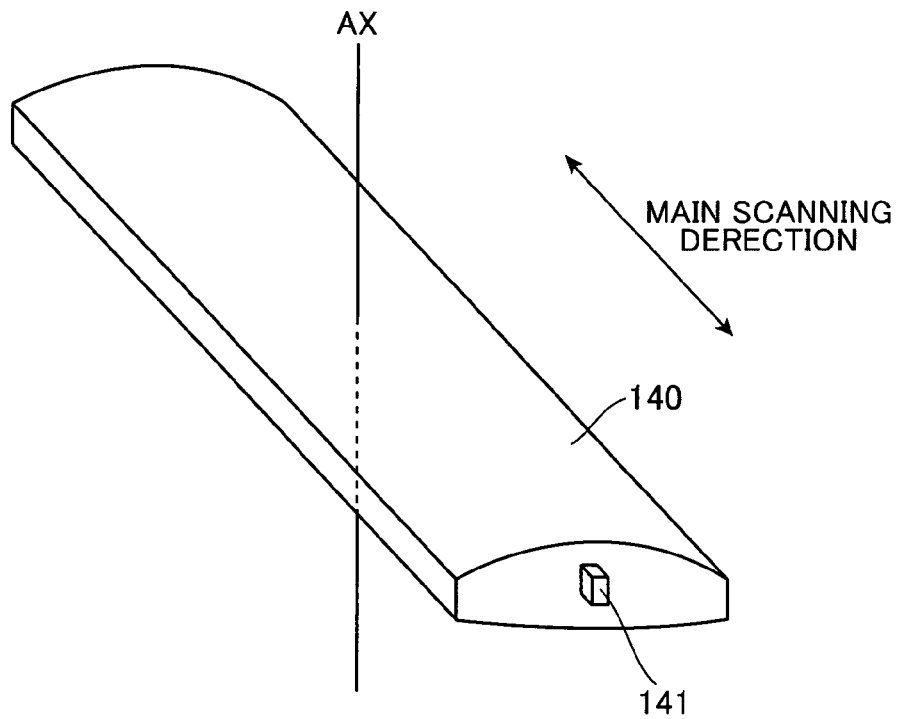
FIG. 4D is a perspective view of a cylindrical lens having a gate portion.
Figure 4E:
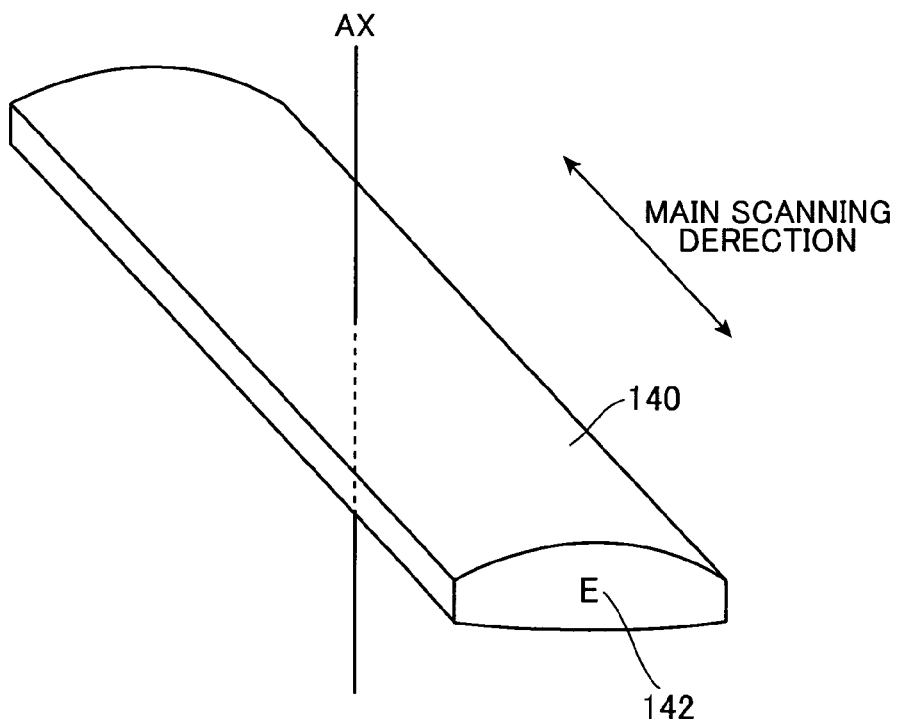
FIG. 4E is a perspective view of a cylindrical lens having a printed symbol.

As shown in FIG. 4D, the cylindrical lenses 140 are also symmetrical with respect to its optical axis AX. Hence the cylindrical lenses 140 can be mounted in the reverse orientation as the fθ lens 120. The orientation of the cylindrical lenses 140 is also distinguished by a gate portion 141. As shown in FIG. 4E, the normal orientation and reverse orientation may also be distinguished by printing a symbol 142 such as the number of the cavity on the cylindrical lens 140, for example. While the method of determining the position of the cylindrical lenses 140 with engaging protrusions and engaging depressions depends on the mounting method, the mounting method described above for the fθ lens 120 may also be applied to the cylindrical lenses 140.

When scanning lenses are molded using a plurality of cavities having the same specifications, the precision required for the mold is extremely high and, ordinarily, differences are produced in the cavities, as described in Japanese patent-application publication No. 2003-262813. When cavities having such differences are used for forming images of different colors in the color image forming apparatus described above, scanning lenses have slightly different optical characteristics and thus registration problems occur when the images are superposed on a recording medium, reducing the image quality.

In the present embodiment, lenses can be mounted in a reverse orientation, thereby increasing the number of usable lenses over setting all lenses in a normal orientation, in order to support mass-production. However, to prevent misregistration when forming images by superposing images of different colors on a recording medium, it is necessary to find combinations of lenses (cavities) having a deviation in color registration that falls within a tolerable range prior to mounting the lenses in the scanning device.

In color image forming apparatuses having a plurality of scanning units for a plurality of colors, as described above, the shape of scan lines produced by scanning units of each color may differ depending on which scanning unit is used, even when the lenses were molded using the same (identical) cavity. Further, when the lenses are mounted in the reverse orientation, the shape of the scan lines on the photosensitive member are not always simply reversed 180 degrees. Therefore, in the present embodiment, a process is performed to search for a combination of cavities for which color registration deviations falls within a tolerable range when color images are formed by actually superposing (superimposing) images of each color. In this process, the shapes of scan lines are measured with actual mounted lenses to acquire data representing the scan line shapes (hereinafter referred to as "scan line shape data").

A device for evaluating characteristics of a light beam, such as that disclosed in Japanese patent-application publication No. 2000-9589, may be used to acquire the scan line shape data, although it will be obvious that a device for acquiring such data is not limited to this evaluation device. Japanese patent-application publication No. 2000-9589 corresponds to U.S. Pat. No. 6,243,124, the disclosure of which is incorporated by reference in its entirety. Below, a simpler example of a method for acquiring scan line shape data will be described.

Figure 5:
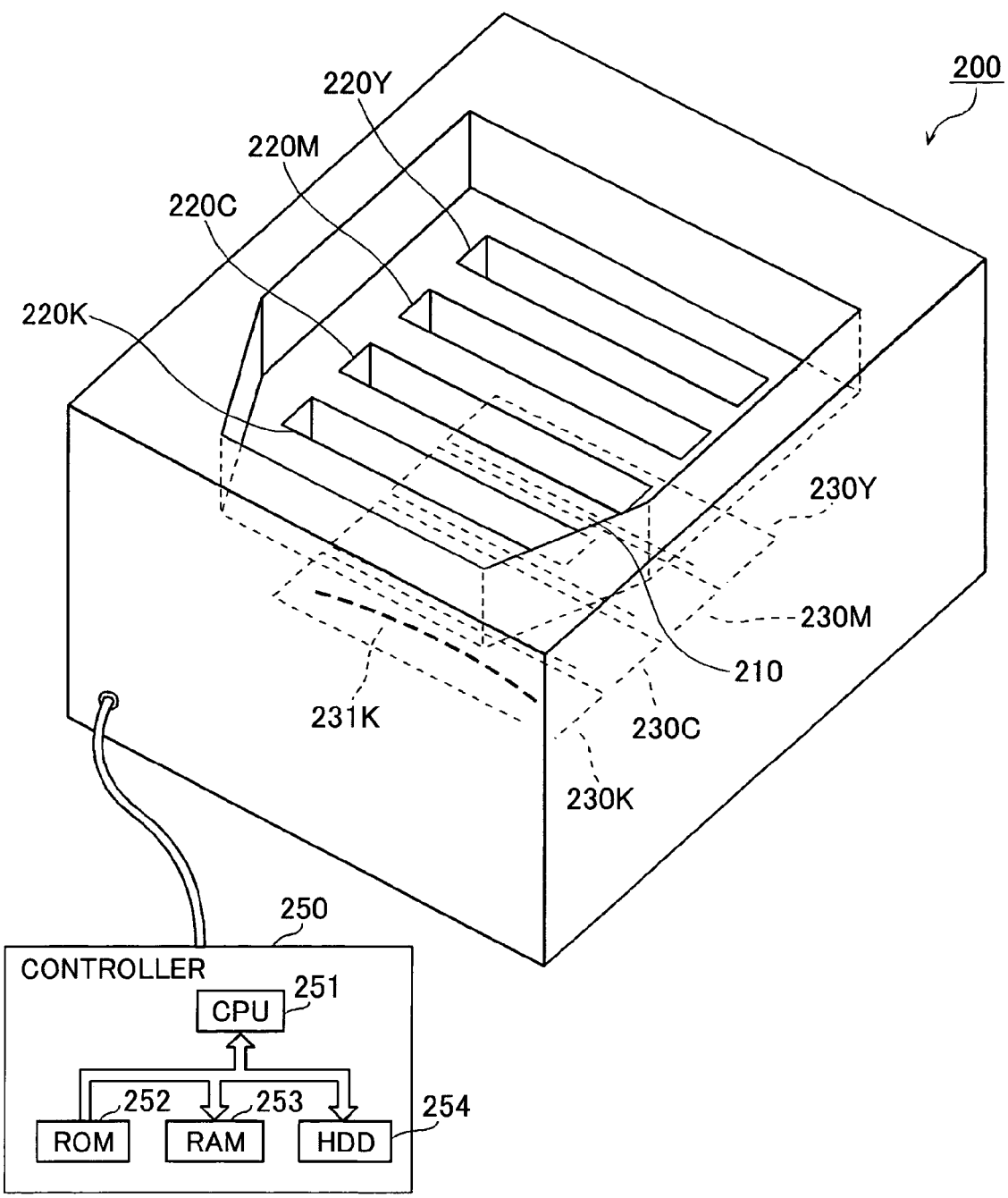
FIG. 5 is a perspective view showing a construction of a measuring device for measuring shapes of scan lines.

FIG. 5 is a perspective view showing a construction of a scan line shape measuring device 200. The measuring device 200 has a mounting portion 210 for mounting the scanning device 100, openings 220Y, 220M, 220C, and 220K formed in the measuring device 200 through which light beams of each color emitted from the scanning device 100 may pass through to irradiate the surfaces of the corresponding photosensitive drums, and area-type solid-state image sensors 230Y, 230M, 230C, and 230K such as area CCDs (hereinafter simply referred to as "CCD sensors 230") for receiving light transmitted through the openings 220.

By disposing the CCD sensors 230 at positions equivalent to the surfaces of the photosensitive drums 3 (exposing positions), the measuring device 200 can measure scan line shapes when the light beam for each color is scanned over the surface of the photosensitive drums to acquire scan line shape data. FIG. 5 shows an example of a scan line 231K when a laser beam for black is scanned over the CCD sensor 230K to acquire the scan line shape data.

The measuring device 200 is also connected to a controller 250 that includes a CPU 251, a ROM 252, a RAM 253, and a hard disk drive 254. In the controller 250, the CPU 251 performs processes to control measurements of scan line shapes, searches for combinations of usable lenses, and the like, while storing data in the RAM 253, based on a computer program stored in the ROM 252. The scan line shape data acquired in these processes are stored in the hard disk drive 254.

Figure 6A:
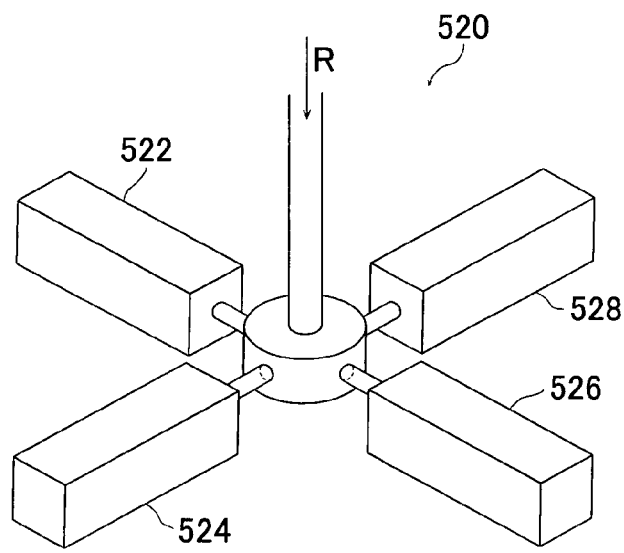
FIG. 6A is a perspective view of a first mold for molding the fθ lenses.
Figure 6B:
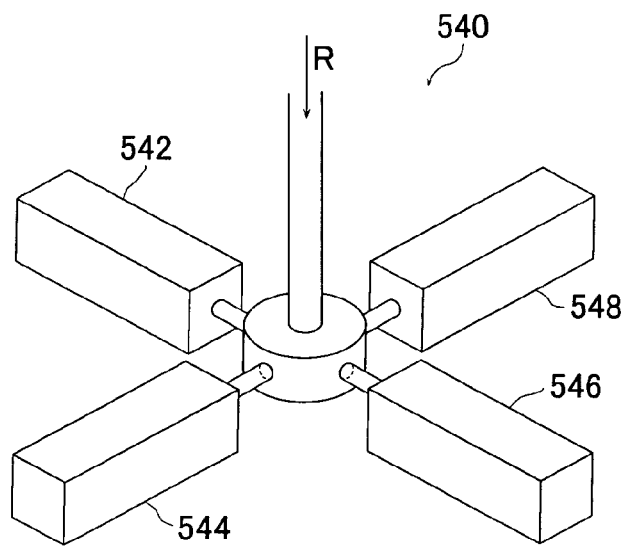
FIG. 6B is a perspective view of one second mold for molding the cylindrical lenses.
Figure 6C:
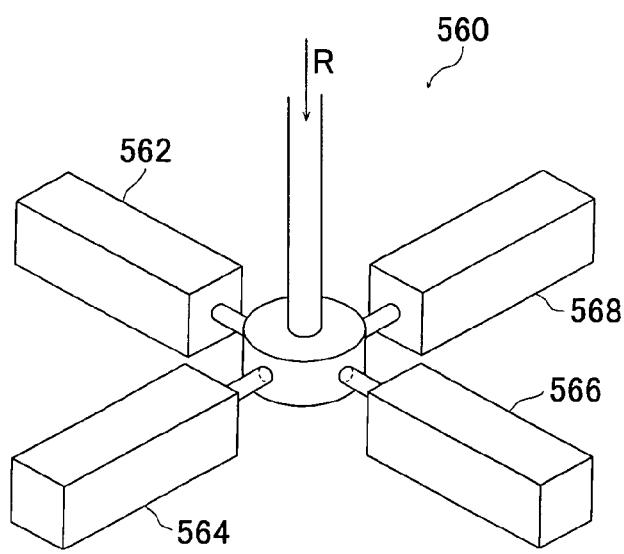
FIG. 6C is a perspective view of another second mold for molding the cylindrical lenses.

While the process for acquiring the scan line shape data may be somewhat complex, it is not impossible because there are normally a limited number of cavities and scanning units. In this simple example, three molds each having four cavities with the same specifications, as shown in FIGS. 6A through 6C, are used for scanning units for four colors. More specifically, the following example describes the acquisition of scan line shape data when using a first mold 520 for the fθ lens 120 and second molds 540 and 560 for the cylindrical lenses 140. Note that the cylindrical lenses 140 are molded using two second molds 540 and 560 each having four cavities with the same specifications.

In the following description, the first mold 520 for molding the fθ lens 120 includes cavity A 522, cavity B 524, cavity C 526, and cavity D 528 having the same specifications; one second mold 540 for molding the cylindrical lenses 140 includes cavity E 542, cavity F 544, cavity G 546, and cavity H 548 having the same specifications; and another second mold 560 for molding the cylindrical lenses 140 includes cavity I 562, cavity J 564, cavity K 566, and cavity L 568 having the same specifications (and the same specifications as the cavities of the second mold 540).

First, the fθ lens 120 molded with the cavity A 522 is mounted in the normal orientation. The cylindrical lenses 140 for each color molded with the cavity E 542 are also mounted in the normal orientation. The scanning device 100 having scanning lenses mounted in this way is mounted in the measuring device 200. When the scanning device 100 emits laser beams, the laser beam for each color passes through the openings 220 of the measuring device 200 and strikes the respective CCD sensors 230. As a result, the measuring device 200 acquires scan line shape data for each color, and the CPU 251 can store the scan line shape data in the hard disk drive 254.

Next, the fθ lens 120 is mounted in the scanning device 100 in the reverse orientation, and the measuring device 200 acquires scan line shape data in the same manner and stores the data in the hard disk drive 254 of the controller 250. Subsequently, the fθ lens 120 is mounted again in the normal orientation, while the cylindrical lenses 140 are mounted in the reverse orientation. The measuring device 200 acquires scan line shape data with this configuration and stores the data in the hard disk drive 254. Finally, both the fθ lens 120 and the cylindrical lenses 140 are mounted in the reverse orientation, and the measuring device 200 acquires scan line shape data and stores the data in the hard disk drive 254. Through this process, scan line shape data corresponding to sixteen combinations can be stored in the hard disk drive 254.

FIG. 6D is a table showing an example of scan line shape data obtained in the process described above. In FIG. 6D, "First cavity" and "Second cavity" indicate the cavity and mounting orientation of the lens. In this table, the data indicates that the cavity A 522 was used for molding the fθ lens 120, and the cavity E 542 was used for molding the cylindrical lenses 140. Note that the table in FIG. 6D only shows the scan line shape data for the cavity A 522 as First Cavity and the cavity E 542 as Second Cavity. The scan line shape data can also be obtained for the cavities B through D as First Cavity and for the cavities F through L as Second Cavity. "-yes" and "-no" indicates whether the lens was rotated 180 degrees or not. For example, "A-no" indicates that the lens was molded with cavity A 522 and mounted in the normal orientation.

The scan line shape data for each color is represented conceptually in the rightmost column of FIG. 5D so that the data is easy to understand visually. However, in reality, the scan line shape data is stored as a set of coordinates representing positions in the main scanning direction and sub-scanning direction, for example.

By acquiring scan line shape data for each cavity, as described above, it is possible to acquire scan line shape data for all possible (conceivable) combinations. After acquiring scan line shape data for all combinations, usable combinations are found for lenses mounted either in a normal or a reverse orientation.

The lenses used in the present embodiment are designed with a shape which can be mounted in the reverse orientation. Thus, scan line shape data for each cavity is compared with each other to find combinations of scanning lenses (cavities) with which color registration problems do not occur when the lenses are mounted in the reverse orientation. In the present embodiment, the process for finding combinations is implemented by a computer program on a computer. The scan line shape data is stored on a hard disk drive that can be read by a computer, various types of semiconductor memory devices, or the like.

Figure 7:
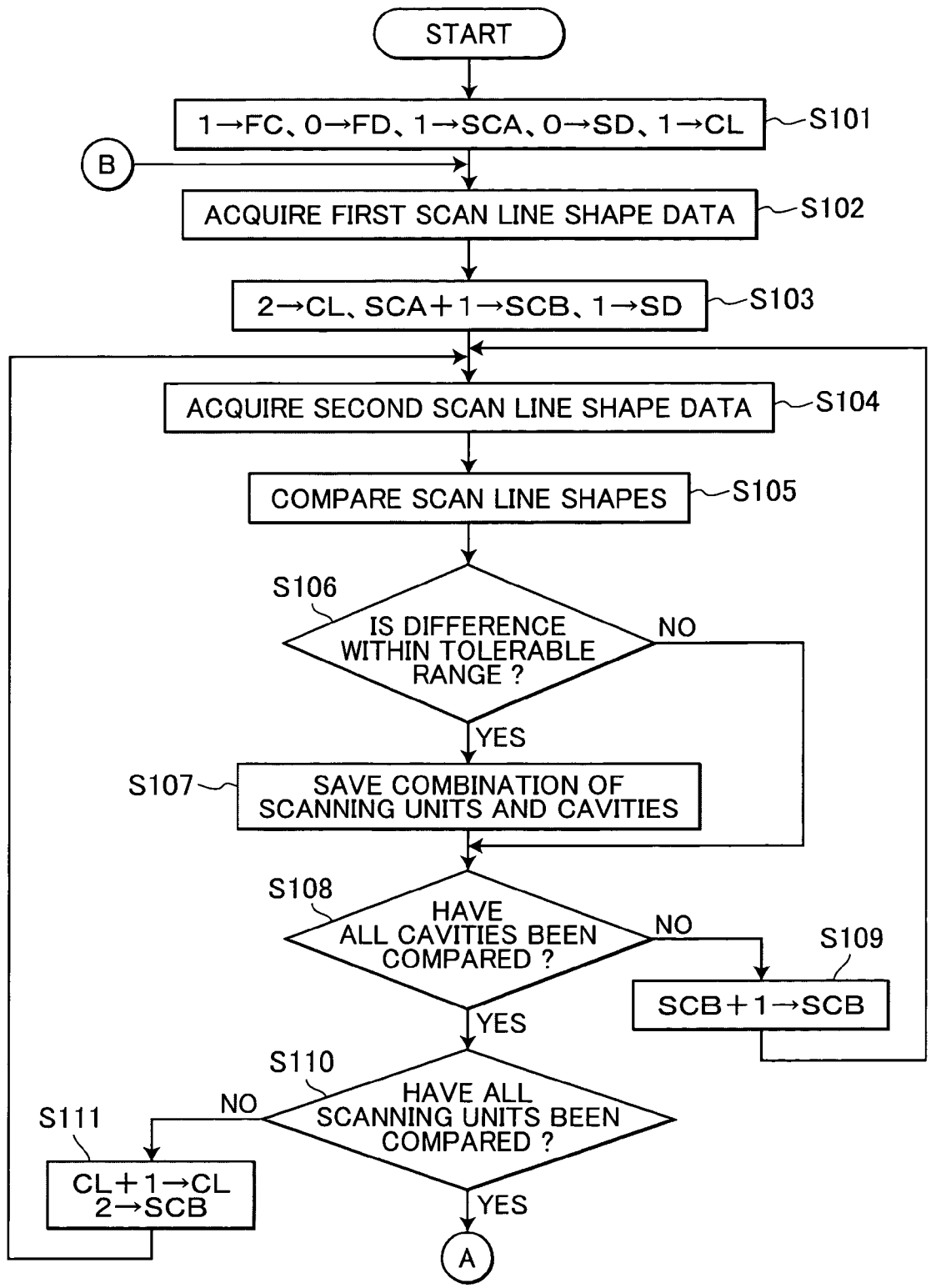
FIG. 7 is a flowchart illustrating steps in a process for finding combinations of scanning lenses.

FIG. 7 is a flowchart illustrating steps in a process executed by the controller 250 according to a computer program for finding combinations of scanning lenses.

In this example, the computer program is designed to find usable combinations of the cylindrical lenses 140, which can also be mounted in the reverse orientation, while the fθ lens 120 is produced from the same cavity and fixed in the same orientation. However, the process implemented by the program is not limited to the following description of the present embodiment.

In the example of FIG. 7, in S101 the CPU 251 sets various variables prior to searching for combinations of lenses by comparing scan line shape data. Here, a variable FC represents the cavity for molding the fθ lens 120. A variable FC of "1" indicates that the fθ lens 120 was molded with the cavity A 522. A variable FD indicates the mounting orientation of the fθ lens 120, where a "0" indicates that the fθ lens 120 is mounted in the normal orientation. Although the variables FC and FD are not modified in the example of FIG. 7, the process may be changed to modify the variables FC and FD.

A variable SCA indicates the cavity used for molding a first cylindrical lens to be compared. A variable SCA of "1" indicates that the first cylindrical lens was molded with the cavity E 542. A variable SCA of "2" indicates the cavity F 544, a variable SCA of "3" indicates the cavity G 546, a variable SCA of "4" indicates the cavity H 548, a variable SCA of "5" indicates the cavity I 562, and so on.

A variable SD here indicates the mounting orientation of the first cylindrical lens, where a "0" indicates that the first cylindrical lens is mounted in the normal orientation.

A variable CL here indicates in which scanning unit (which color) the first cylindrical lens is mounted. A variable CL of "1" indicates that the cylindrical lens is mounted in the yellow scanning unit. A CL of "2" indicates the magenta scanning unit, a CL of "3" indicates the cyan scanning unit, and a CL of "4" indicates the black scanning unit.

After the variables have been set, in S102 the CPU 251 acquires scan line shape data as shown in FIG. 6D based on the variables set above. In the example of FIG. 7, the CPU 251 acquires scan line shape data for the case in which the first cavity is "A-no" (FC=1, FD=0), the second cavity is "E-no" (SCA=1, SD=0), and the color is yellow (CL=1) as the first scan line shape data to be compared (FIG. 6D).

In S103 the CPU 251 sets variables for acquiring scan line shape data for a second cylindrical lens to be compared. A variable SCB indicates the cavity used for molding the second cylindrical lens. A variable SCB of "1" indicates that the second cylindrical lens was molded with the cavity E 542. A variable SCB of "2" indicates the cavity F 544, a variable SCB of "3" indicates the cavity G 546, a variable SCB of "4" indicates the cavity H 548, a variable SCB of "5" indicates the cavity I 562, and so on.

The variable SD here indicates the mounting orientation of the second cylindrical lens, where a "1" indicates that the second cylindrical lens is mounted in the reverse orientation.

Accordingly, in S103 the variables are set such that scan line shape data is acquired for the second cylindrical lens molded with the cavity F 544 (SCB=2) and mounted in the magenta scanning unit (CL=2) in the reverse orientation (SD=1). According to these settings, in S104 the CPU 251 acquires scan line shape data when the first cavity is "A-no", the second cavity is "F-yes", and the color is magenta according to the format in the table of FIG. 6D.

After acquiring the second scan line shape data, in S105 the CPU 251 compares the first and second scan line shape data and in S106 determines whether the difference between the two scan line shapes formed on the photosensitive member fall within a tolerable range. More specifically, the CPU 251 determines whether the deviation of colors in the sub-scanning direction is less than or equal to 100 μm (micrometers) when images are superposed on a recording medium using the two scan line shapes. If the difference obtained from this comparison is within the tolerable range (S106: YES), then in S107 the CPU 251 saves the combination as a usable combination in a storage device, such as a memory unit. Note that the value of 100 μm has been chosen because most humans cannot detect misregistrations of less than or equal to 100 μm.

Figures 8, 9:
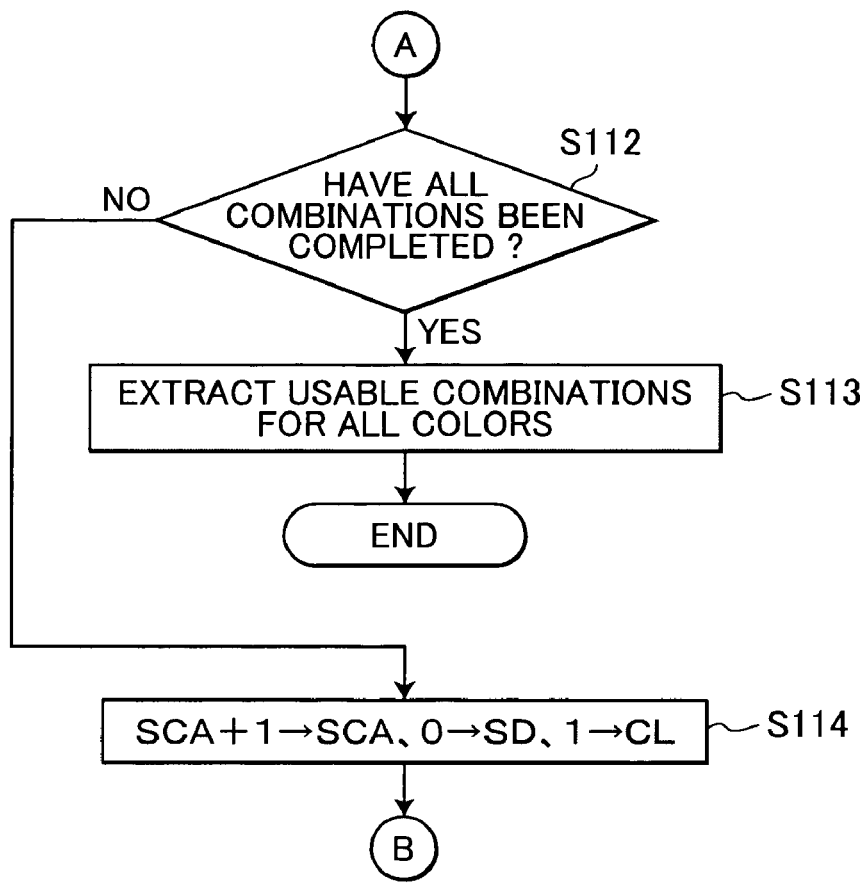
FIG. 8 is a flowchart illustrating steps in the process for finding combinations of scanning lenses, which is continued from FIG. 7.
FIG. 9 is a table showing a sample format for combination data saved in memory.

FIG. 9 shows a sample format for combination data saved in memory. In the example of FIG. 9, combination data 501 saved in memory indicates that deviations in color registration in the sub-scanning direction fall within the tolerable range when the yellow cylindrical lens 140Y is molded with the cavity E 542 and mounted in the normal orientation ("E-no" as one second cavity, and the color Y), and the magenta cylindrical lens 140M is molded with the cavity F 544 and mounted in the reverse orientation ("F-yes" as the other second cavity, and the color M), and when the fθ lens 120 is molded with the cavity A 522 and mounted in the normal orientation ("A-no" as the first cavity). The other combinations 502 through 504 are similar.

Returning to the flowchart in FIG. 7, if not all cavities have been compared (S108: NO), then in S109 the CPU 251 increments the variable SCB by one in order to find the next cavity and returns to S104. Assuming that data for the cylindrical lenses molded with the cavity E 542 has been acquired and compared at this point, next, scan line shape data when using the cylindrical lens molded with the cavity F 544 is acquired for comparison.

When data for all cavities has been compared (S108: YES), then in S110, the CPU 251 determines whether data has been compared for all scanning units (all colors). If data has not been compared for all scanning units (S110: NO), then in S111 the CPU 251 increments the variable CL by one and resets the variable SCB to 2. Subsequently, the CPU 251 returns to S104 and compares scan line shape data for each cavity when the cylindrical lens 140C of the cyan scanning unit (CL=3) is mounted in the reverse orientation.

After the process for comparing data for all scanning units is completed (S110: YES), the CPU 251 advances to the process shown in the flowchart of FIG. 8. In S112 of FIG. 8, the CPU 251 determines whether the process for comparing all possible combinations is complete. If all possible combinations have been completed (S112: YES), then in S113 the CPU 251 extracts combinations of usable cavities and scanning units for all colors (Y, M, C, K) from the usable combinations shown in FIG. 9, and the process ends.

More specifically, based on the sample combination data shown in FIG. 9, the CPU 251 extracts as usable combinations the fθ lens 120 molded with the cavity A 522 and mounted in the normal orientation, the yellow cylindrical lens 140Y molded with the cavity E 542 and mounted in the normal orientation, the magenta cylindrical lens 140M molded with the cavity F 544 and mounted in the reverse orientation, the cyan cylindrical lens 140C molded with the cavity G 546 or the cavity H 548 and mounted in the reverse orientation, and the black cylindrical lens 140K molded with the cavity G 546 and mounted in the reverse orientation.

If not all possible combinations have been completed (S112: NO), then in S114 the CPU 251 increments the variable SCA by one, that is, changes the cavity for the first cylindrical lens and returns to S102 of FIG. 7. In the process described above, the CPU 251 searches for combinations of usable cavities and scanning units (colors) including the cylindrical lenses 140Y through 140K that are usable in the reverse orientation, when the fθ lens 120 is molded with the cavity A 522 and mounted in the normal orientation. When subsequently assembling the actual scanning device 100, the lenses are mounted in usable orientations in accordance with the extracted data (extracted combinations). Although combinations have been found with a fixed fθ lens 120 in the example described above, combinations may also be found while sequentially changing the cavity and mounting orientation of the fθ lens 120 as well.

While the invention has been described in detail with reference to the specific embodiment thereof, it would be apparent to those skilled in the art that various changes and modifications may be made therein without departing from the spirit of the invention.

(1) For example, a mechanism can be provided for adjusting the inclination of the fθ lens 120 and the cylindrical lenses 140 or the positions of the lenses in the sub-scanning direction in order to reduce the magnitude of curves in the scan lines (bows) through fine adjustments of lens inclinations and positions.

(2) In addition, a process may be performed to find combinations that are usable after making such fine adjustments of the lens inclination and position described above. For example, since the scan line shape data is saved in a coordinate format, a range of coordinates that can be changed through the fine adjustments can be calculated in order to find combinations for which deviations in color registration fall within the tolerable range (within 100 µm) after the fine adjustments are performed.

(3) Further, the degree of misregistration (i.e., deviation in the sub-scanning direction) when scanning lenses are mounted in the reverse orientation may be assigned a numeric value and stored along with the combination data. With this configuration, combinations having smaller deviation in color registration are selected in preference to combinations having larger deviation, enabling the manufacturing of a color image forming apparatus that produces less deviation in color registration.

(4) Further, suitable improvements can be made to the process implemented by the computer program. For example, the order of comparing scan line shape data, the selection of scan line shape data to be compared, and the like may be modified appropriately based on usage conditions of the cavities and the like.

(5) In the above-described embodiment, engaging protrusions 120a and 120b are provided on the top and bottom of the fθ lens 120 (FIGS. 4A through 4C). However, engaging protrusions may also be provided on the cylindrical lenses depending on the lens mounting method.

(6) In the above-described embodiment, the color laser printer 1 includes the scanning device 100 that irradiates four laser beams onto the same reflecting surfaces of the polygon mirror 110. However, in a modification shown in FIG. 10, a scanning device 700 irradiates two laser beams on opposite surfaces of a polygon mirror 710.

Figure 10:
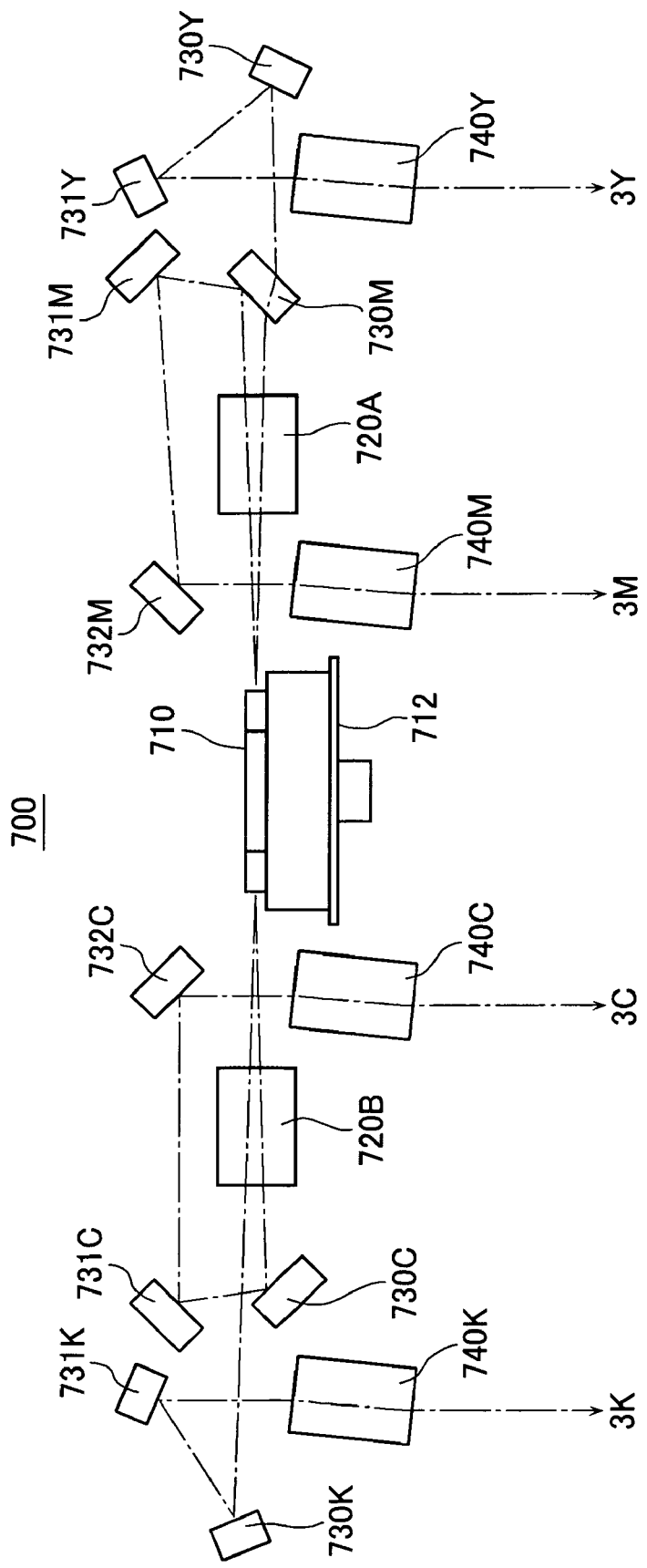
FIG. 10 is an explanatory diagram showing a construction of a scanning device according to a modification.

As shown in FIG. 10, scanning units corresponding to two laser beams irradiated on the photosensitive drums 3Y and 3M are disposed to the right of the polygon mirror 710, while scanning units corresponding to two laser beams irradiated on the photosensitive drums 3C and 3K are disposed to the left of the polygon mirror 710. The scanning units are provided with a lens 720A and a lens 720B. The lens 720A is shared by the two laser beams irradiated on the photosensitive drums 3Y and 3M, while the lens 720B is shared by the two laser beams irradiated onto the photosensitive drums 3C and 3K.

In FIG. 10, cylindrical lenses 740 (740Y, 740M, 740C, 740K) are provided for each color for converging the laser beams for each color in the sub-scanning direction (the rotational direction of the photosensitive drum). A laser beam is reflected off the surfaces of the polygon mirror 710 and passes through the lenses 720A and 720B. Reflecting mirrors 730 (730Y, 730M, 730C, 730K) are provided for guiding the laser beam of each color before the laser beam passes through the cylindrical lenses 740, so that the laser beam reaches the surfaces of the corresponding photosensitive drums 3. The reflecting mirror 730M has an upper region formed as a normal mirror and a lower region which is coated to improve transmittance, so that the upper region reflects the magenta laser beam, while the lower region allows the yellow laser beam to pass.

The lenses 720A and 720B and the cylindrical lenses 740 are shaped so that mounting in the reverse orientation is possible. Hence, the present invention can be applied to the modification of FIG. 10.

The present invention can also be applied to a construction such as that shown in FIG. 1 of Japanese patent-application publication No. HEI-11-64754, the disclosure of which is incorporated by reference in its entirety. In this case, the present invention applies to principal lenses 12A and 12B and auxiliary lenses 16A1, 16A2, 16B1, and 16B2. The present invention can also be applied to a construction such as that described in FIGS. 14 and 15 of Japanese patent-application publication No. 2003-241126. In this example, the present invention applies to optical devices 61a through 61d, and 62a through 62d. Japanese patent-application publication No. 2003-241126 corresponds to U.S. Pat. No. 6,825,870, the disclosure of which is incorporated by reference in its entirety.

(7) In addition to the combinations found in the above-described embodiment, a plurality of lenses that can be mounted in a scanning device may be marketed as a lens set.

In this case, the lenses are preferably provided with marks that indicate at least the orientation in which the lenses are to be mounted in the scanning device. The marks may be implemented by the gate portion 121 shown in FIG. 4A, whereby the orientation is determined based on the location of the gate portion 121, or may be formed by printing a symbol or the like on the lens. The marks may also be an arrow pointing up or down. This configuration can prevent unusable lenses from being incorrectly mounted in the scanning device.

(8) The computer program in the above-described embodiment may be stored on and loaded from any suitable storage medium, such as a flexible disk, CD-ROM, DVD, or flash memory, or may be acquired from a server via a network, such as the Internet.

(9) In the above-described embodiment, the engaging protrusions 120a and 120b are provided on the top and bottom surfaces, respectively, of the fθ lens 120 (FIGS. 4A through 4C). Alternatively, engaging depressions may be formed on the top and bottom surfaces of the fθ lens 120, while an engaging protrusion is provided on the unit frame 160. The same goes for the cylindrical lenses 140.

(10) In the above-described embodiment, the controller 250 connected to the measuring device 200 performs the process for finding combinations of scanning lenses. However, the combination searching process may be implemented on a computer provided separately from the measuring device 200. Further, the controller 250 may be built into the measuring device 200 rather than being connected thereto.

(11) In the above-described embodiment, the measuring device 200 is used for measuring the shapes of scan lines. However, it is possible to form actual test images on paper by the color laser printer 1 and to measure a deviation in the sub-scanning direction by another measuring device.

(12) In the above-described embodiment, the four photosensitive drums 3Y, 3M, 3C, and 3K are provided in the color laser printer 1. However, only a single image bearing member may be provided. For example, a single photosensitive belt may be provided at a position of the paper conveying belt 60 in the color laser printer 1 (FIG. 1) instead of the photosensitive drums 3Y, 3M, 3C, and 3K.

What is claimed is:

1. A color image forming apparatus for forming color images on a recording medium by superposing images one after another, the apparatus comprising:
at least one image bearing member that bears a latent image thereon;
a first scanning unit and a second scanning unit, each scanning unit scanning at least two light beams over the at least one image bearing member to form the latent image thereon, and
a scanning unit frame in which the first and second scanning units are disposed, the scanning unit frame having lens mounting portions for receiving a spherical lens and at least one cylindrical lens for each scanning unit;
wherein the first scanning unit and the second scanning unit each has a spherical lens having an optical axis and a shape substantially symmetrical with respect to the optical axis;
wherein each spherical lens is selected from a plurality of lens molded from a plurality of cavities having the same specifications and adapted to be positioned to receive the light beam prior to the light beam being split into at least two beams for transmission to cylindrical lenses and adapted to be oriented in a first position or in a second position rotated 180 degrees about its optical axis from the first position, each spherical lens having first and second position determining portions provided at two locations symmetrical with respect to the optical axis of the lens; and
wherein the first position determining portion is capable of engaging with the lens mounting portion when the spherical lens is disposed in a normal orientation, and the second position determining portion is capable of engaging with the lens mounting portion when the lens is disposed in a reverse orientation rotated 180 degrees from the normal orientation about the optical axis.

2. The color image forming apparatus according to claim 1, wherein the lens mounting portion is either an engaging depression or an engaging protrusion; and
wherein the position determining portions are either engaging protrusions or engaging depressions that engage with the engaging depression or engaging protrusion of the lens mounting portion.

3. The color image forming apparatus according to claim 1, wherein the spherical lens has a first surface and a second surface, both of the first surface and the second surface being planar surfaces; and
wherein the position determining portions are provided on the first surface and the second surface.

4. The color image forming apparatus according to claim 1, wherein the spherical lens has a mark indicating the normal orientation.

5. The color image forming apparatus according to claim 4, wherein the mark includes a gate portion that is used for injecting resin to mold the spherical lens and that remains on the spherical lens after the molded lens is cut out from the mold.

6. The color image forming apparatus according to claim 4, wherein the mark indicates a cavity used to mold the spherical lens.

7. The color image forming apparatus according to claim 1 wherein the first and second position determining portions are provided in a center region of at least the spherical lens with respect to a main scanning direction.

8. The color image forming apparatus according to claim 7 wherein the first and second position determining portions are engaging protrusions that are provided on top and bottom surfaces in the center region of at least the spherical lens with respect to the main scanning direction, when the color image forming apparatus is disposed in an orientation in which the color image forming apparatus is intended to be used.

9. A scanning device comprising:
a first scanning unit and a second scanning unit that scan a light beam, the first scanning unit and the second scanning unit sharing a spherical lens having an optical axis and a shape substantially symmetrical with respect to the optical axis positioned upstream of at least two cylindrical lenses; and
a scanning unit frame in which the plurality of scanning units is disposed, the scanning unit frame having a lens mounting portion;
wherein at least the spherical lens has a first position determining portion and a second position determining portion, the first and second position determining portions being provided at respective two locations symmetrical with respect to the optical axis; and
wherein the first position determining portion is capable of engaging with the lens mounting portion when at least the spherical lens is disposed in a normal orientation, and the second position determining portion is capable of engaging with the lens mounting portion when at least the spherical lens is disposed in a reverse orientation rotated 180 degrees from the normal orientation about the optical axis.

10. The scanning device according to claim 9 wherein the first and second position determining portions are provide in a center region of at least the spherical lens with respect to a main scanning direction.

11. The scanning device according to claim 10 wherein the first and second position determining portions are engaging protrusions that are provided on top and bottom surfaces in the center region of at least the spherical lens with respect to the main scanning direction, when the scanning device is disposed in an orientation in which the scanning device is intended to be used.

* * * * *